March 8, 1927. 1,620,214

D. C. KLAUSMEYER

BELT SHIFTER

Filed Nov. 8, 1921 4 Sheets-Sheet 2

INVENTOR
David C Klausmeyer
BY Albert F. Nathan
ATTORNEY

March 8, 1927.　　　D. C. KLAUSMEYER　　　1,620,214
BELT SHIFTER
Filed Nov. 8, 1921　　4 Sheets-Sheet 3

INVENTOR
David C. Klausmeyer
BY
Albert F. Nathan
ATTORNEY

March 8, 1927.　　　　　D. C. KLAUSMEYER　　　　　1,620,214
BELT SHIFTER
Filed Nov. 8, 1921　　　4 Sheets-Sheet 4
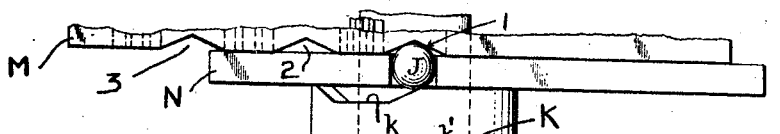
Fig. 8.
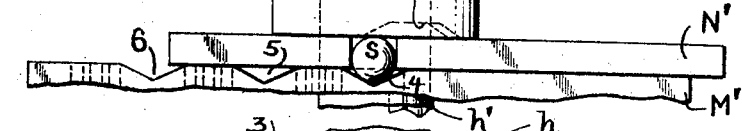
Fig. 9.
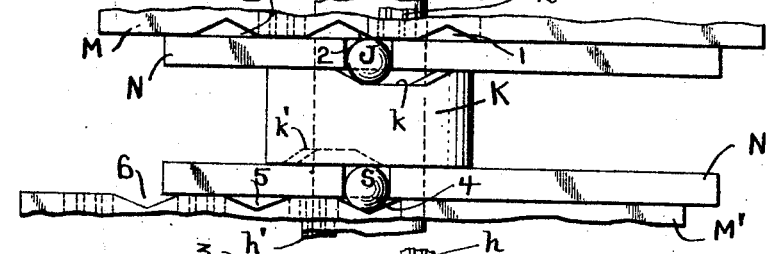
Fig. 10.
Fig. 11.
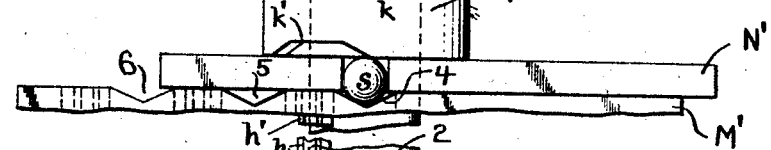
Fig. 12.
INVENTOR
David C. Klausmeyer
BY
Albert F. Nathan
ATTORNEY Patented Mar. 8, 1927.

1,620,214

UNITED STATES PATENT OFFICE.

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO.

BELT SHIFTER.

Application filed November 8, 1921. Serial No. 513,637.

This invention appertains to belt shifters for machinery and it deals with certain improvements in the construction thereof insuring positiveness of action and ease in operation.

While many belt shifters have heretofore been developed, they are nevertheless either too costly or too complicated or too unlikely to function smoothly and invariably. Among the most satisfactory types heretofore proposed, is that in which a rotatable gear-segment operates on an interrupted rack but, as so designed, such prior devices either do not insure an unfailing engagement of the teeth or else are faulty in not automatically locking the rack against being misplaced by the back-thrust exerted by the belt.

This invention aims to overcome these difficulties and, at the same time, to attain an essentially simple and efficient arrangement which is well adapted to be installed on machine-tools or wherever it is desirable mechanically to shift a belt running around two conversely-arranged stepped-pulleys.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
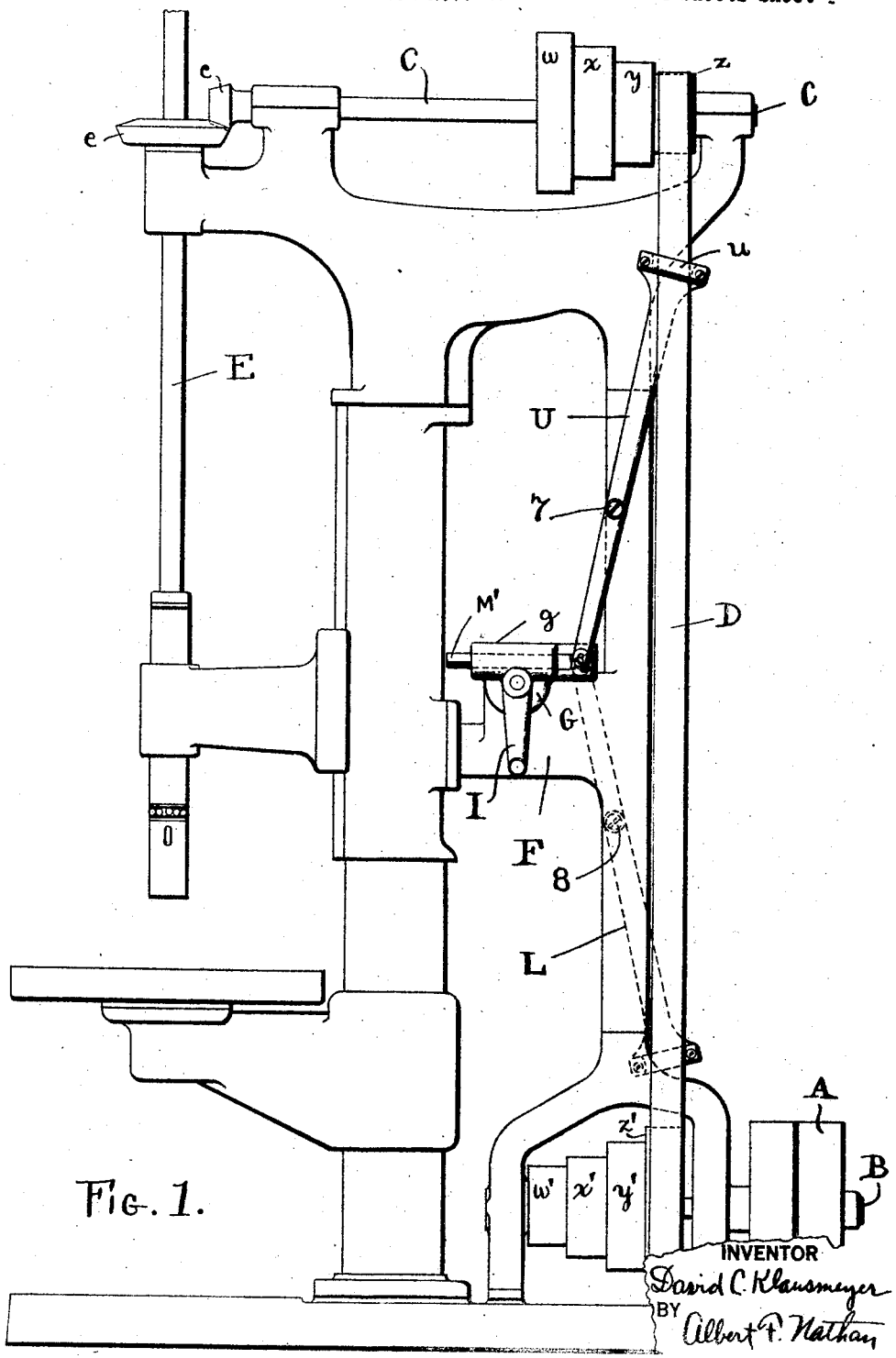
Figures 2, 3:
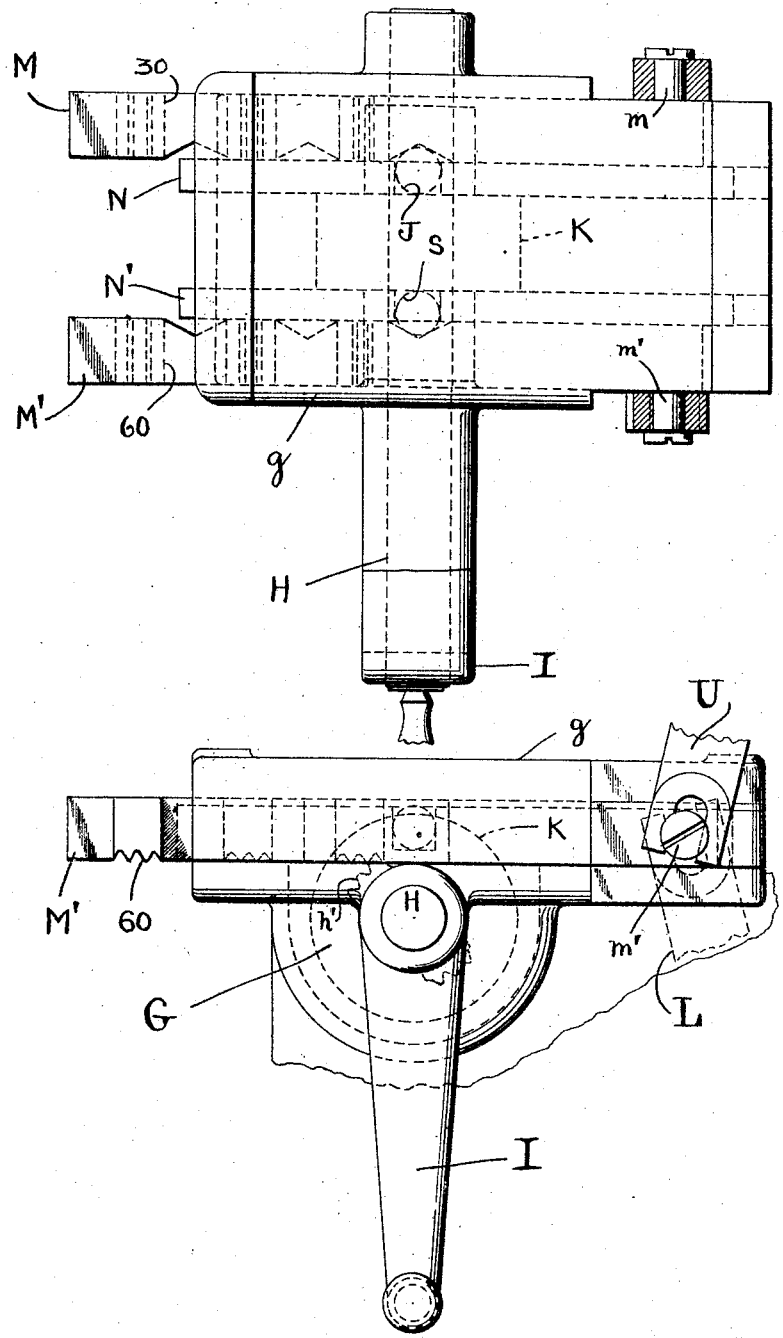
Figure 4:
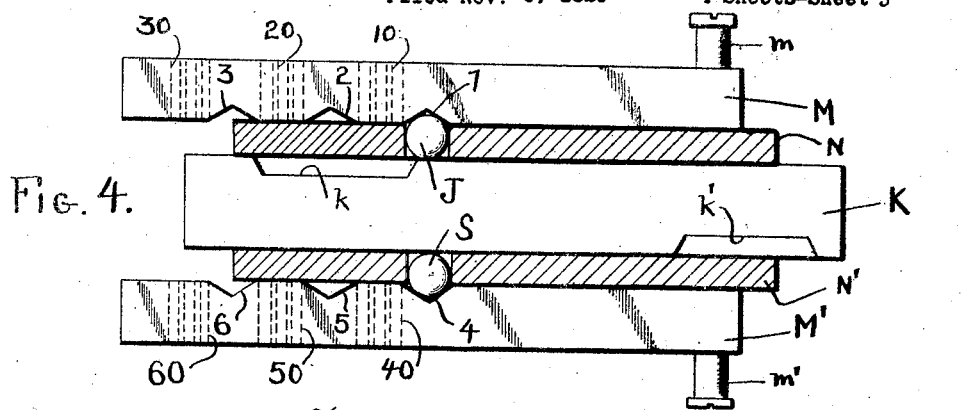
Figure 5:
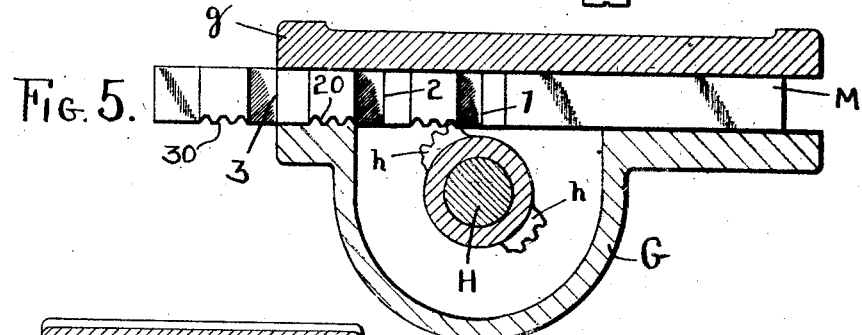
Figure 6:
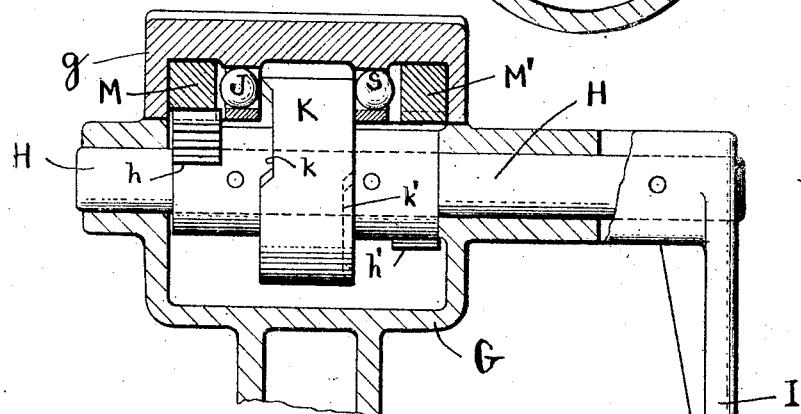
Figure 7:
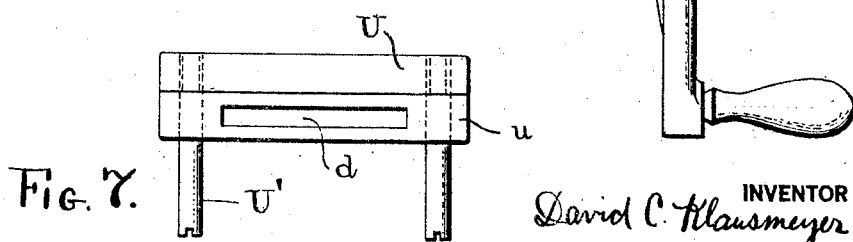

Fig. 1 is an elevation showing a so-called upright drill embodying a belt-shifter conforming to this invention. Fig. 2 is a plan of the operating mechanism for the belt shifter. Fig. 3 is a side elevation of the same. Fig. 4 is a diagrammatic layout showing the primary elements, and the relations therebetween, of this invention. Fig. 5 is a median vertical section through the device shown by Fig. 2. Fig. 6 is a transverse section of the same. Fig. 7 is a detail of the connection between the lever and the belt fashioned to accommodate the spread of the belt occasioned by its position on the various graduated steps of the pulleys. Figs. 8 to 12 represent the successive positions assumed by the parts when actuated to shift the belt from one step to the other of the two pulleys.

Referring to the drawings, Fig. 1 shows a variable speed transmission including a driving pulley A, a driving shaft B, a driven shaft C and some part, such as the spindle E, which derives motion therefrom, as through the gears $c$ and $e$. The power is transmitted from the driving to the driven elements by means of a belt D adapted to ride on the pairs of steps $z$ and $z'$, $y$ and $y'$, $x$ and $x'$, or $w$ and $w'$, of the stepped pulleys conversely arranged on the shafts C and D respectively.

The variation in speed is accomplished in the conventional manner by shifting the belt; the operation consisting first in shifting the belt from a larger to a smaller step to give it the necessary slack and then to shift its other end from a smaller to a larger step. It is rather troublesome and somewhat dangerous to do this by hand by reason of the motion of the belt and pulleys, and various belt-shifters have accordingly been designed to do it mechanically and hence safely and more easily. In the present case, two shifting levers U and L are pivotally mounted at suitable points 7 and 8 and their free ends are provided with means for engaging the belt at points close to the pulleys toward which they run. In this instance, these levers swing in fixed planes and the spread of the belt (caused by the variation in the diameters of the steps of the pulleys) is taken care of by means of stirrups $u$ sliding on pins U' projecting from the end of the lever; the belt passing through a slot $d$ provided by the shiftable stirrup.

A suitable instrumentality is connected to the other ends of the levers U and L so as to actuate these levers in the necessary sequence, and to the necessary extent, and also to retain these levers positively in their various proper positions; this instrumentality being manually operated most conveniently by a continuous motion of a crank I. As shown best by Figs. 2 to 6, inclusive, this operating instrumentality comprises a housing G suitably affixed to or forming a part of a stationary member F which may be a portion of the frame of a machine-tool. A shaft H is suitably journaled in said housing, as shown by Fig. 6, and its protruding end is secured to the crank I whereby said shaft H may be continuously rotated through a complete revolution to accomplish a shifting of the belt from one step to the next of the two pulleys; and so on. The one lever U has a pin and slot connection with its shifter M' through the pivot-pin $m'$, and the lower lever L has a similar connection through the pin $m$ with its shifter M. These shifters are in the nature of slide bars adapted to be moved longitudinally in suitable slide-ways provided by the housing; in this instance the slide-ways being formed in the cap $g$ which is suitably attached to the housing as a part thereof.

These actuators are in the nature of interrupted racks and are operated intermittently by the gear-segments $h$ and $h'$ respectively (see Fig. 5) adapted to successively engage the groups of teeth 10, 20, 30, 40, 50 and 60 of the respective rack bars. The teeth of these respective groups are spaced in the same relation to each other as though the rack was continuous so that the gear-segments, when leaving one set of teeth, will be able, accurately and smoothly, to engage the next set of teeth without any interference. It is to be noted that these gear-segments projects sufficiently from the peripheral portion of the part on which they are mounted to leave a clearance between such part and the corresponding rack-bar so that, when the teeth are disengaged, the rack-bar is free to translate save for means which will presently be described and which means will prevent any displacement such as would tend to create a tooth interference at the time of effecting an engagement between the gear-segment and the next group of teeth. In other words, the relation between each gear segment and its associated rack is such that, save for its teeth, the gear segment exercises no restraint on the shift of the rack. It will be noted also that the gear segments occupy different angular positions in the arc of revolution of the shaft H and in this case they are 180° apart. Hence, when the shaft H is turned, first the one rack and then the other will be advanced or retreated; according to the direction of the rotation. The effect of this alternate movement of the respective racks will be to actuate the levers U and L alternately, first to shift the belt at one end on to a smaller step and then to cause its other end to mount the larger step. This action takes place in either direction, according to which way the handle I is turned, and it terminates when the limit of travel of the racks is reached; this limit being determined by the inability of the gear segment to find any teeth with which to mesh and also by the fact that the locking mechanism is not released, owing to an inability to turn the shaft H unless the gear-segments can find teeth with which to mesh.

In the absence of some means for locking the rack bars against displacement when the teeth are not in mesh, this device would be likely to become deranged and therefore provision has been made for preventing this from happening. Adjacent each rack-bar are stationary parts N and N', respectively, which in this instance are each in the form of a guide-rail depending from the cover or cap $g$. Each rail is provided with an aperture in which is located a detent J and S, respectively; these detents being preferably in the form of hardened balls. At intervals, (corresponding to the spacing of the teeth 10, 20 and 30) the rack-bar M is provided with sockets 1, 2 and 3 in its side adjacent the rail N. Likewise the other rack-bar M' is provided with sockets 4, 5 and 6. A member K, preferably in the nature of a double-faced cam, is provided in its side-periphery with two recesses $k$ and $k'$ so located that, when the member K turns with the gear segments, the corresponding socket will permit the detent to be released from its associated rack as soon as the gear-segment engages the rack; thus enabling it to advance the rack. The pocket is sufficiently long to enable the advance to be continued until the gear-segment is in the act of disengaging itself from the rack. At this instant, the ball is forced out of the pocket and into one of the corresponding sockets, 1, 2 or 3 and is kept there in by the continuous side of the cam K. In this way, the racks are locked positively against displacement at all times except when the gear teeth are operating to advance it, or to retreat it, as the case may be.

It will thus be perceived that this invention is well adapted to accomplish the objects aforesaid and is very simple in construction and positive in action. Its operation may easily be followed on sheet 4 of the drawings in which Fig. 8 shows the ball J just released as the gear segment engages the rack M. Fig. 9 shows the cam K in the act of pushing the ball J into the next pocket 2; the gear segment having pushed the rack forward to swing the lower end of the lever L to the left and slip the belt onto a smaller step of the lower pulley. Fig. 10 shows the ball J in locking position to hold the lever L in place and it also shows the ball S released to permit the advance of the rack M' to shift the lever U controlling the upper end of the belt. Fig. 11 shows the parts after the advance of the rack M' is completed and Fig. 12 shows both racks locked.

Without further analysis, the foregoing will so fully reveal the gist of this invention that others can, by applying current knowledge, readily adapt it for various utilizations by retaining one or more of the essential characteristics of either the generic or specific aspects of this invention, and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A belt-shifter combining a gear-segment; an interrupted rack adapted to be intermittently advanced thereby; a relatively stationary member having a socket; a detent normally engaging said rack and positioned by said socket; and means rotatable with said gear-segment for controlling the retreat of said detent to permit movement of said rack.

2. In a belt-shifter, a gear-segment; a member having a series of sets of teeth adapted successively to be engaged by said gear-segment to move said member intermittently; and means including an element rotatable with said gear-segment and a detent actuated by said rotatable element for positively locking said member against movement only when out of engagement with said gear-segment.

3. In a belt-shifter, two gear-segments arranged 180° apart; an intermittent rack for each; a locking-detent for each rack; and two cam surfaces movable with said gear-segments, said cam-surfaces being disposed 180° apart and each adapted to release the detent controlled thereby only when the respective gear-segment is in tooth-engagement with its rack.

4. A belt-shifter combining a gear-member; a rack adapted to be intermittently advanced thereby; a relatively stationary member having a socket; a detent normally engaging said rack and positioned by said socket; means rotatable with said gear-member for controlling the retreat of said detent to permit movement of said rack; and a belt-shifting lever actuated by said rack.

5. In a belt shifter, a gear segment; a member having teeth adapted to be engaged by said gear-segment to move said member intermittently; means, including a cam rotatable with said gear-segment and a movable detent actuated by the cam, for positively locking said member against movement only when out of engagement with said gear-segment; and a lever connected to said member.

6. In a belt-shifter, two gear-segments arranged 180° apart; an intermittent rack for each; a locking-detent for each rack; two cam surfaces movable with said gear-segments, said cam-surfaces being disposed 180° apart and each adapted to release the detent controlled thereby only when the respective gear-segment is in tooth-engagement with its rack; and two belt-shifting levers actuated by said racks respectively.

7. A belt-shifter combining two parallel translatable members each providing several spaced groups of teeth; a rotatable part providing a first group of teeth in the plane of the first member and a second group of teeth in the plane of the second member; said groups being separated angularly to engage said members alternately and advance them intermittently; two conversely arranged stepped-pulleys; an endless belt; means engaging the opposite portions of said belt and actuated respectively by said members first to shift the belt down one step and then up another; and a detent actuated directly by said part when its teeth are disengaging positively to lock the actuated member against shifting.

8. A belt-shifter combining two parallel translatable members each providing several spaced groups of teeth; a rotatable part providing a first group of teeth in the plane of the first member and a second group of teeth in the plane of the second member, said groups being separated angularly to engage said members alternately and advance them intermittently; two conversely arranged stepped-pulleys; an endless belt; means engaging the opposite portions of said belt and actuate respectively by said members first to shift the belt down one step and then up another; and a ball engaging said rotatable part and urged directly thereby into locking engagement with its associated member as soon as said part ceases to advance said member.

9. A belt-shifter combining two parallel translatable members each providing several spaced groups of teeth; a rotatable part providing a first group of teeth in the plane of the first member and a second group of teeth in the plane of the second member, said groups being separated angularly to engage said members alternately and advance them intermittently; two conversely arranged stepped-pulleys; an endless belt; means engaging the opposite portions of said belt and actuated respectively by said members first to shift the belt down one step and then up another; a relatively stationary element having a socket; a detent located in said socket; and a cam rotatable with said part for projecting said detent into engagement with its associated member to lock it against shift at predetermined stations in the cycle of rotation of said part.

10. A belt-shifter combining two parallel translatable members each providing several spaced groups of teeth and a corresponding number of similarly spaced notches; a rotatable part providing a first group of teeth in the plane of the first member and a second group of teeth in the plane of the second member, said groups being separated angularly to engage said members alternately and advance them intermittently; two conversely arranged stepped-pulleys; an endless belt; means engaging the opposite portions of said belt and actuated respectively by said members first to shift the belt down one step and then up another; and means actuated directly by said rotatable part and cooperating with said spaced notches for locking said members against translation when disengaged from said part.

11. A belt-shifter combining two parallel translatable members each providing several spaced groups of teeth and a corresponding number of similarly spaced notches; a rotatable part providing a first group of teeth in the plane of the first member and a second group of teeth in the plane of the second member, said groups being separated angularly to engage said members alternately and advance them intermittently; two conversely arranged stepped-pulleys; an endless belt; means engaging the opposite portions of said belt and actuated respectively by said members first to shift the belt down one step and then up another; and a non-yielding detent actuated by said rotatable part when its teeth are disengaging to engage the adjacent notch and thereby lock the actuated member against shifting.

12. A belt-shifter combining two parallel translatable members each providing several spaced groups of teeth and a corresponding number of similarly spaced notches; a rotatable part providing a first group of teeth in the plane of the first member and a second group of teeth in the plane of the second member, said groups being separated angularly to engage said members alternately and advance them intermittently; two conversely arranged stepped-pulleys; an endless belt; means engaging the opposite portions of said belt and actuated respectively by said members first to shift the belt down one step and then up another; a relatively stationary element having a socket; a detent located in said socket; and a cam rotatable with said part for projecting said detent into the registering notch of its associated member to lock it against shift at predetermined stations in the cycle of rotation of said part.

13. A belt-shifter combining two parallel translatable members each providing several spaced groups of teeth and a corresponding number of similarly spaced notches; a rotatable part providing a first group of teeth in the plane of the first member and a second group of teeth in the plane of the second member, said groups being separated angularly to engage said members alternately and advance them intermittently; two conversely arranged stepped-pulleys; an endless belt; means engaging the opposite portions of said belt and actuated respectively by said members first to shift the belt down one step and then up another; and a ball forced by said rotatable part into the notch presented by its associated member as soon as said part ceases to advance said member.

14. In combination with a frame and belt-connected step-pulleys carried thereby, a belt-shifter for each end of the belt, said shifters comprising levers fulcrumed, intermediate their ends, to said frame and having belt-engaging portions at their outer ends; a casing carried by said frame adjacent the inner ends of said levers; two parallel rack-bars translatably mounted in said casing and each connected with one of said levers; a rotatable member journaled in said casing and providing diametrically arranged gear-segments each in the plane of one of said rack-bars and adapted alternately to engage the teeth thereof to shift said rack-bars intermittently; and a nonyielding detent actuated by said rotatable member to positively lock one of said rack-bars against movement while the other is being shifted.

15. In combination with belt-connected transposed step-pulleys, a belt-carrier for each end of the belt; carrier operating means comprising rack and pinion mechanism for converting rotary motion into rectilinear carrier motion; a cam-member mounted coaxial with said pinion and rotatable synchronously therewith; a positive lock actuated by said cam member for rendering said motion converting means alternately inoperative with respect to the two carriers, said carrier operating means being arranged so that the advancing step-shifted belt end moves from a larger to a smaller diameter pulley wheel, while the following step movement of the other end of the belt is from a smaller to a larger diameter pulley wheel.

16. The combination set forth in claim 15 characterized by this, that the outer ends of the belt shifting levers are each provided with a belt-guiding stirrup having a belt-guiding slot only slightly larger than the cross-sectional area of the belt, said stirrups being laterally shiftable on said levers to permit them to adjust themselves to the various positions of the belt caused by the variation in the size of the pulleys.

17. A belt-shifter combining a housing, a shaft rotatably journaled therein, a plurality of toothed racks translatably mounted in said housing; a belt-shifting lever connected with each rack, a member adjacent each rack and formed with an aperture, a rack-locking element in each of said apertures; a plurality of gear-segments secured to said shaft and arranged in angular relation, a rotatable member secured to said shaft and provided with cam-surfaces adapted to act successively on said locking elements, and means to rotate said gear-segments and said rotatable member to cause said segments alternately and intermittently to shift said racks and to cause said cam-surfaces alternately to shift said locking element into positive locking engagement with the then stationary rack.

18. A belt shifter combining two parallel translatable members each providing several spaced groups of teeth; a rotatable part providing a first group of teeth in the plane of the first member and a second group of teeth in the plane of the second member, said groups being separated angularly to engage said members alternately and advance them intermittently; two conversely arranged stepped-pulleys; an endless belt; means engaging the opposite portions of said belt and actuated respectively by said members first to shift the belt down one step and then up another; and means including an element angularly movable with said rotatable part and a shiftable detent actuated by said element for locking said members against translation when disengaged from said part.

In witness whereof, I hereunto subscribe my name.

DAVID C. KLAUSMEYER.